No. 892,589. PATENTED JULY 7, 1908.
B. C. GILLIGAN.
GLASS MOLD.
APPLICATION FILED JULY 10, 1907.
2 SHEETS—SHEET 1.
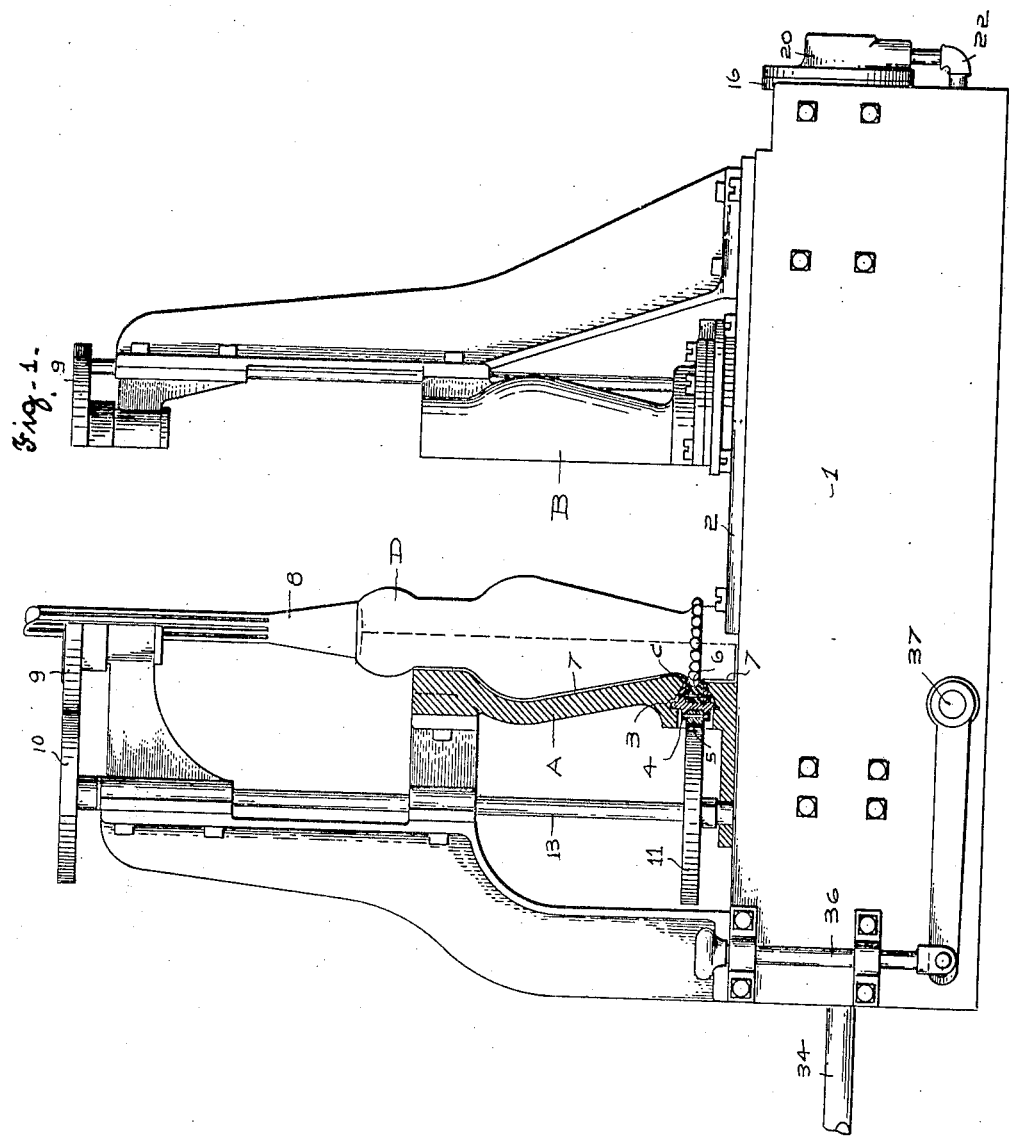

No. 892,589.
PATENTED JULY 7, 1908.
B. C. GILLIGAN.
GLASS MOLD.
APPLICATION FILED JULY 10, 1907.
2 SHEETS—SHEET 2.
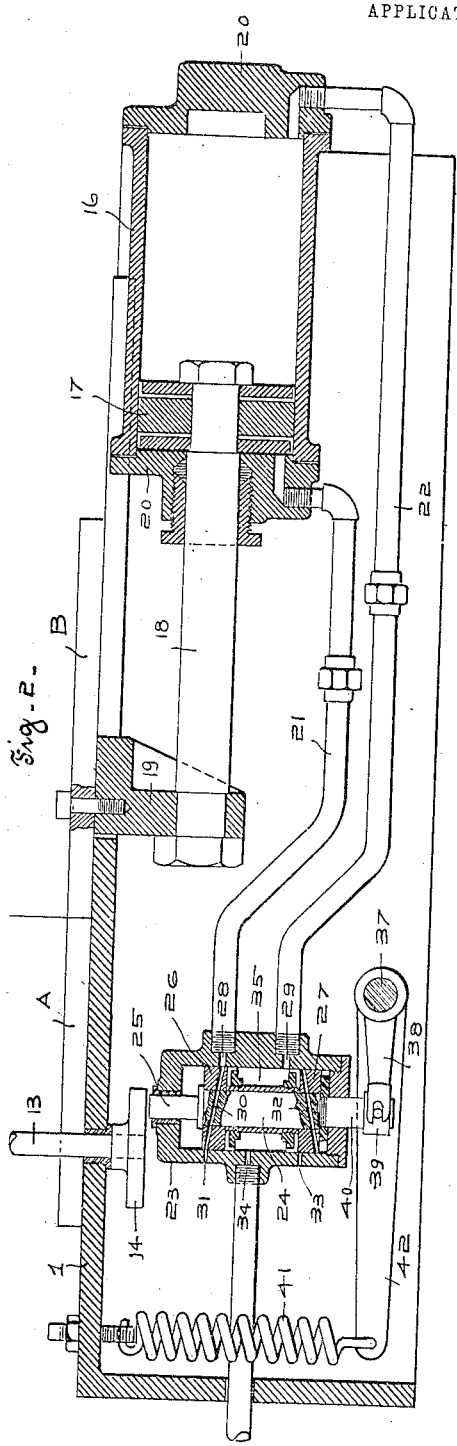
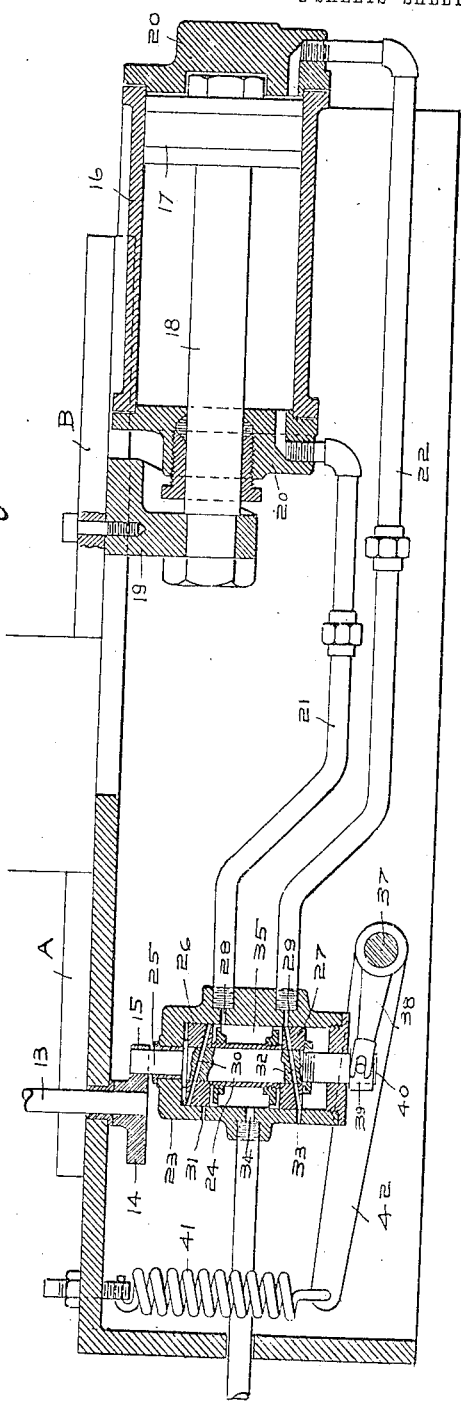
Witnesses—
Inventor—
Bernard C. Gilligan
By Herman H. Martin
Atty

UNITED STATES PATENT OFFICE.

BERNARD C. GILLIGAN, OF TOLEDO, OHIO.

GLASS-MOLD.

No. 892,589.

Specification of Letters Patent.

Patented July 7, 1908.

Application filed July 10, 1907. Serial No. 383,157.

*To all whom it may concern:*

Be it known that I, BERNARD C. GILLIGAN, a citizen of the United States, residing at Toledo, in the county of Lucas and State of Ohio, have invented a new and useful Improvement in Glass-Molds, of which the following is a specification.

My invention relates to glass mold, and has for its object to provide a mold of the kind, adapted to produce glass ware, comprising a mold polished portion or portions and an integral portion or portions provided with mold impressions and being of like nature as the mold polished portion or portions, and provide means for closing and opening said mold with fluid or air under pressure.

The objects of my invention are accomplished as hereinafter described and illustrated in the drawings in which Figure 1 is a side view of my mold showing the mold partly in section and opened for removing the glassware. Fig. 2 is a longitudinal section of the operating mechanism showing the mold in the closed position, and Fig. 3 is a like view, showing the operating mechanism in position with the mold open.

Upon the mold base 1 is mounted the fixed mold section A and its complementary section B is movable against or from the fixed mold section between gibs 2. Each mold section is built up to form a V groove 3 to receive in each a semi V ring 4 having each a semi gear 5 at the rim. Each semi V ring is annularly grooved to receive a semi mold section C, the bodies of which are formed of a composition of carbon and graphite or other material possessing a like nature. These mold sections are each provided with mold impressions 6 adapted to form decorations on the glass ware. 7 designates a paste lining for the mold above and below the carbon ring sections. In a mold thus constructed the glass article blown therein may be mold polished under and above the ring sections and mold impressed at the ring section, and as the ring sections are composed of a material like that which is pasted on the walls of the mold, a glass article is produced having an equal nature and without chills between the mold polished sections and the section with mold impressions.

The blow pipe 8 is adapted to engage a partable gear 9, the sections of which are respectively disposed above the fixed mold section A and the movable mold section B and are adapted by means of gear 10 and gear 11, to transmit motion to the gear ring sections when the mold is closed and the blow pipe is turned. A shaft 13 to which gears 10 and 11 are fixed extends below the top of the base and has secured at its end a disk 14 provided with an aperture 15 for engagement with a locking pin when the revoluble ring sections are in parting line with the mold sections.

The opening and closing mechanism consists of a cylinder 16, having a piston 17 the rod 18 of which is coupled to a bracket 19 fixed to the underside of the movable mold section B. Each cylinder head 20 is tapped for the conduits 21 and 22 respectively which are led from the cylinder to a valve body 23, the axis of which is in line with the axis of the aperture 15 in disk 14. The valve 24 is formed with a pin 25, movable upward into the aperture 15 and comprises piston like enlargement 26 and 27, suitably separated, whereby, at the down stroke of the valve, piston 26 closes the port 28 to conduit 21 and piston 27 opens the port 29 to conduit 22, thus permitting pressure to enter at rear of piston to close the mold; the pressure in front of the cylinder piston being released through by-pass 30 and out let port 31 in the valve body.

At the end of the up stroke of the piston valve, and when the pin 25 has entered the apperture 15 in disk 14, the piston 27 closes the port 29 and piston 26 opens port 28 to permit pressure to enter the cylinder in front of its piston to open the mold, the pressure at the opposite side of the cylinder piston, finding release through conduit 22, by pass 32 in piston 27 and exhaust port 33. The supply of fluid or air under pressure is constant through a conduit 34 ported to the valve chamber 35 between the valve pistons. The piston valve is moved downward by means of a treadle 36 operating on shaft 37 upon which a yoke lever 38 is secured to engage a trunnion collar 39 fixed to the valve extension 40. When the treadle is released, the upward engaging movement of the piston valve is produced, by a spring 41 coupled to base 1 and a lever 42, having one end fixed to the shaft 37. The spring 41 is brought into tension when the treadle is depressed, but upon release of the treadle the spring urges the valve upwards, the valve pin bearing against the underside of the disk 14 until the parting line of the ring sections coincides with the parting line of the mold and the aperture 15 is in line with the valve pin upon which the up movement is completed and the mold is opened for removing the glass ware D.

What I claim is—

1. In a glass mold, a partible mold, having mold wall lining for mold polishing the glass ware, a mold ring, partible with the mold sections, having mold impressions and its mold body composed of a material like the polishing lining of the mold, means to revolve the ring with the glass and means to open and close the mold.

2. In a glass mold, a partible mold having mold wall lining and with an annular mold section let into the body of the mold and partible with its sections, being formed of material like the mold wall lining and provided with decorations for impressing glass ware, means to hold the impressing section stationary with reference to the glass ware, and means to open and close the mold with fluid under pressure.

3. In glass molds for forming mold polished ware having a mold impressed integral portion or portions, a partible mold having mold wall lining for polishing the glass, an annular section or sections, partible with the mold, its body or bodies being formed of a material like the polishing lining of the mold and being provided with decorations for impressing the glass ware, means to hold the impressing section or sections stationary with reference to the glass ware during the forming process and the polishing operation and means to open and close the mold.

4. In a glass mold, a partible mold having a mold wall lining for mold polishing glass ware, a mold ring section partible with the mold sections, provided with means for mold impressing the glass ware during the blowing and polishing operation, its body being formed of a composition of carbon and graphite or other like materials, containing the decorations and adapted to produce conjointly with the partible lined mold glass ware of equal nature between the mold polished portion or portions and the integral mold impressed ware portion or portions, means to revolve the impressing section with the glass ware and means to open and close the mold.

5. In a glass mold, comprising partible mold sections provided with an annular mold portion or portions, partible with the mold sections and being provided with decorations for mold impressing the glass ware, means to rotate the annular mold portion or portions with the glass, means for opening and closing the mold, comprising a cylinder, a piston and piston rod, the latter being coupled to one of the mold sections, a valve chamber, pipe coupled to the ends of the cylinder, a valve movable through the chamber adapted to alternately supply and release fluid under pressure from the respective ends of the cylinder and being provided with means adapted to prevent rotation of the annular mold portion or portions when the parting line of its sections coincides with the parting line of the mold, a pressure supply pipe to the valve chamber and means adapted to automatically operate the valve in the direction preventing rotation of the annular mold portion or portions.

In witness whereof, I have hereunto signed my name in the presence of two subscribing witnesses, this 8th day of July, 1907.

BERNARD C. GILLIGAN.

In presence of—
 Wm. J. Fritsche,
 Fred H. Kruse.